(12) United States Patent
Hiraki et al.

(10) Patent No.: US 6,505,295 B1
(45) Date of Patent: Jan. 7, 2003

(54) DATA PROCESSOR

(75) Inventors: Mitsuru Hiraki, Kodaira (JP); Atsushi Kiuchi, Higashimurayama (JP); Kesami Hagiwara, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/367,536

(22) PCT Filed: Feb. 17, 1997

(86) PCT No.: PCT/JP97/00411

§ 371 (c)(1),
(2), (4) Date: Aug. 16, 1999

(87) PCT Pub. No.: WO98/36351

PCT Pub. Date: Aug. 20, 1998

(51) Int. Cl.[7] ................................................. G06F 9/40
(52) U.S. Cl. ........................ 712/241; 712/205; 712/207
(58) Field of Search ................................ 712/241, 205, 712/207

(56) References Cited

U.S. PATENT DOCUMENTS

| 4,626,988 A | * | 12/1986 | George | 712/241 |
| 5,257,359 A | * | 10/1993 | Blaseo et al. | 711/138 |
| 5,579,493 A | * | 11/1996 | Kiuchi et al. | 712/207 |
| 5,809,326 A | * | 9/1998 | Nogami | 712/32 |

FOREIGN PATENT DOCUMENTS

| JP | 56-54550 | 5/1981 |
| JP | 61-229125 | 10/1986 |
| JP | 63-41932 | 2/1988 |
| JP | 63-163929 | 7/1988 |
| JP | 64-88840 | 4/1989 |
| JP | 3-163626 | 7/1991 |
| JP | 4-43432 | 2/1992 |
| JP | 4-62637 | 2/1992 |
| JP | 4-293124 | 10/1992 |
| JP | 4-333929 | 11/1992 |

OTHER PUBLICATIONS

"TMS320C30 Third Generation Digital Signal Processor Users Manual", published by TI Japan, Ltd. 1990, pp. 7–2 to 7–5.

* cited by examiner

Primary Examiner—Kenneth S. Kim
(74) Attorney, Agent, or Firm—Mattingly, Stanger & Malur, P.C.

(57) ABSTRACT

To provide a data processing apparatus equipped with a control means to reduce the power required for memory accessing, in spite of the unavailability of a repeat instruction, by reading instructions reiteratively from a small scale buffer in loop processing. Also to provide a data processing apparatus equipped with a means to opt to apply, or not to apply, control to read instructions, that have to be executed reiteratively in loop processing, out of a small scale buffer reiteratively.

If, as a result of execution of an instruction to alter the content of a certain register prior to a series of instructions to be executed reiteratively, the register satisfies a specific condition, the series of instructions to be executed repeatedly are read out of a small scale buffer reiteratively.

A data processing apparatus equipped with a control means to reduce the power required for memory accessing, in spite of the unavailability of a repeat instruction, by reading instructions reiteratively from a small scale buffer in loop processing can be provided. Also a data processing apparatus equipped with a means to opt to apply, or not to apply, control to read instructions, that have to be executed reiteratively in loop processing, out of a small scale buffer reiteratively can be provided.

22 Claims, 14 Drawing Sheets

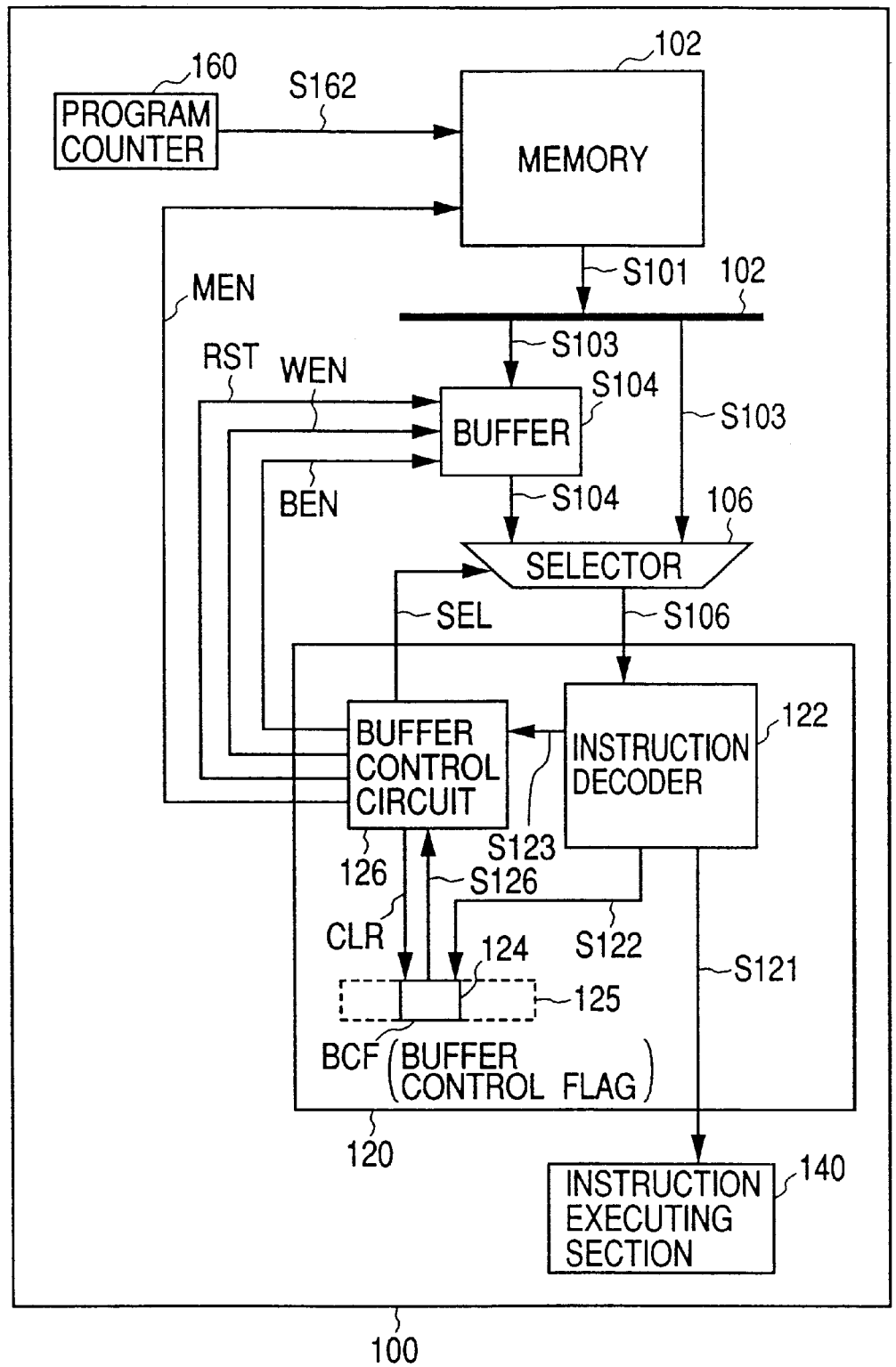

FIG. 3

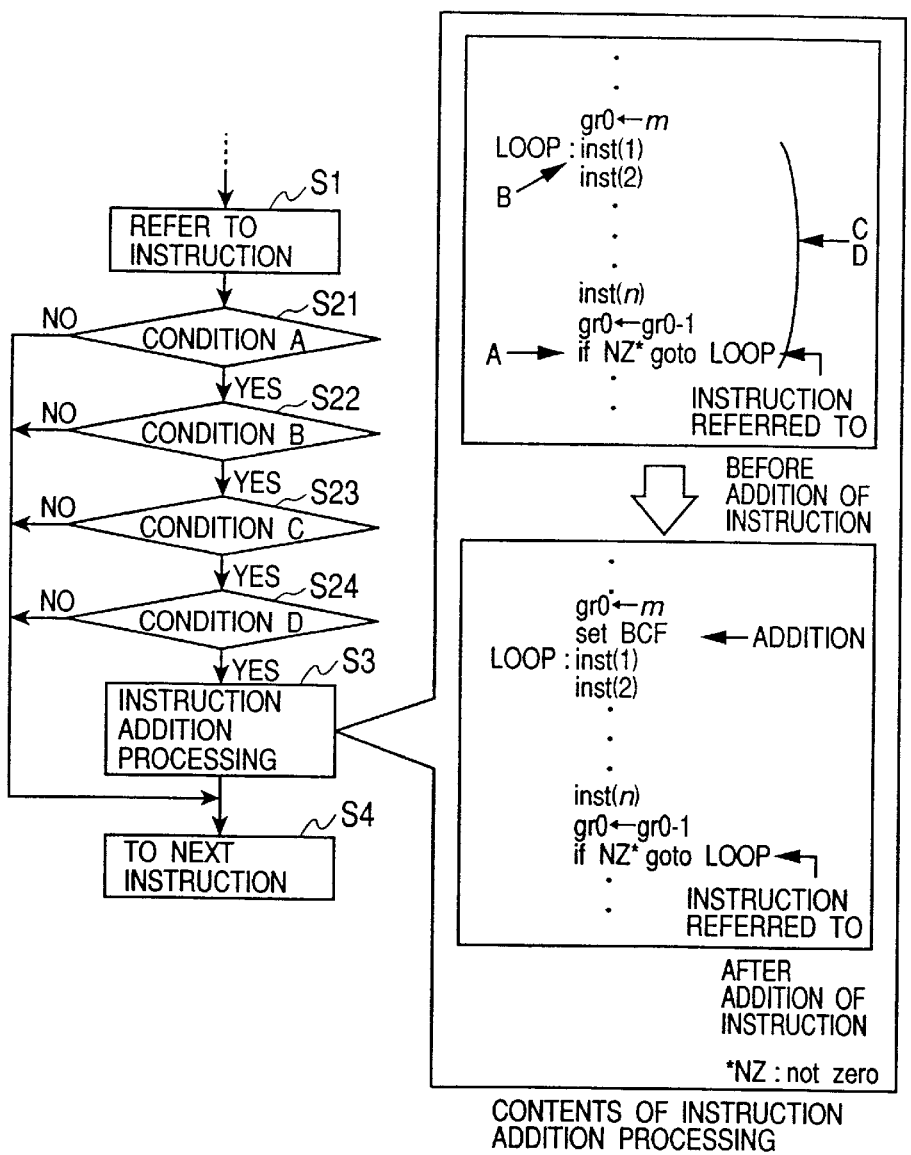

CONTENTS OF INSTRUCTION ADDITION PROCESSING

CONDITION A: THE INSTRUCTION REFERRED TO IS A CONDITIONAL BRANCHING INSTRUCTION

CONDITION B: (ADDRESS OF BRANCHING DESTINATION) < (ADDRESS OF CONDITIONAL BRANCHING INSTRUCTION)

CONDITION C: (NUMBER OF INSTRUCTIONS FROM INSTRUCTION ON BRANCHING DESTINATION TO CONDITIONAL BRANCHING INSTRUCTION) ≦ (MAXIMUM NUMBER OF INSTRUCTIONS BUFFER 104 CAN ACCOMMODATE)

CONDITION D: BETWEEN INSTRUCTION ON BRANCHING DESTINATION AND CONDITIONAL BRANCHING INSTRUCTION, THERE IS NO OTHER FLOW CONTROL INSTRUCTION (BRANCHING INSTRUCTION OR THE LIKE)

FIG. 6

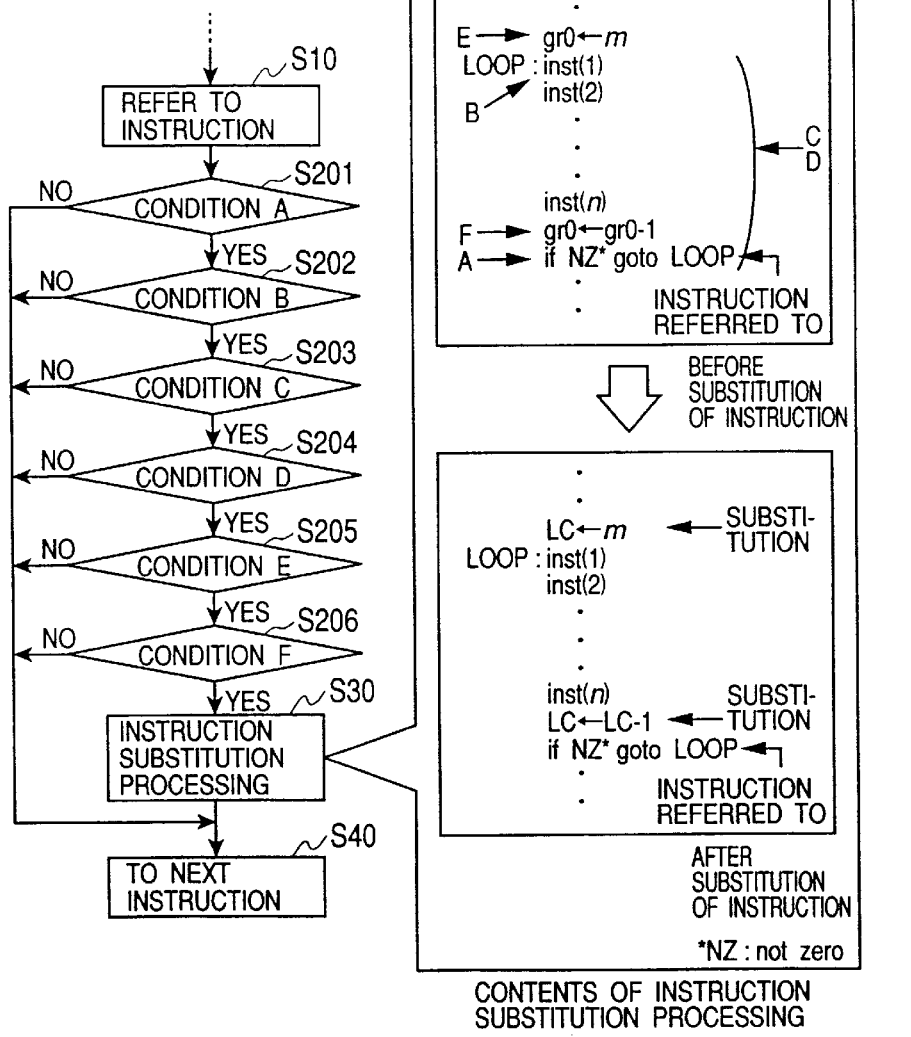

CONTENTS OF INSTRUCTION SUBSTITUTION PROCESSING

CONDITION A: THE INSTRUCTION REFERRED TO IS A CONDITIONAL BRANCHING INSTRUCTION

CONDITION B: (ADDRESS OF BRANCHING DESTINATION) < (ADDRESS OF CONDITIONAL BRANCHING INSTRUCTION)

CONDITION C: (NUMBER OF INSTRUCTIONS FROM INSTRUCTION ON BRANCHING DESTINATION TO CONDITIONAL BRANCHING INSTRUCTION) ≤ (MAXIMUM NUMBER OF INSTRUCTIONS BUFFER 704 CAN ACCOMMODATE)

CONDITION D: BETWEEN INSTRUCTION ON BRANCHING DESTINATION AND CONDITIONAL BRANCHING INSTRUCTION, THERE IS NO OTHER FLOW CONTROL INSTRUCTION (BRANCHING INSTRUCTION OR THE LIKE)

CONDITION E: INSTRUCTION IMMEDIATELY BEFORE BRANCHING DESTINATION IS INSTRUCTION INTO CERTAIN REGISTER

CONDITION F: INSTRUCTION IMMEDIATELY BEFORE CONDITIONAL BRANCHING DESTINATION IS INSTRUCTION TO DECREMENT REGISTER COUNT

FIG. 15

|  |  | MEANS TO REALIZE BUFFER ||
|  |  | HAVE BUFFER SEPARATELY FROM INSTRUCTION QUEUES (IQ) | DIVERT INSTRUCTION QUEUES (IQ) TO REALIZE BUFFER |
| --- | --- | --- | --- |
| MEANS TO DETERMINE USE OR NON-USE OF BUFFER | CONTROL FLAG (BCF) | EMBODIMENT 1 | EMBODIMENT 4<br>EMBODIMENT 5 |
|  | LOOP COUNT REGISTER (LC) | EMBODIMENT 2 |  |
|  | REPEAT START ADDRESS REGISTER AND REPEAT END ADDRESS REGISTER (RS, RE)* | EMBODIMENT 3 |  |

* ONLY WHERE REPEAT INSTRUCTION IS SUPPORTED

DATA PROCESSOR

This is a national stage application filed under 35 U.S.C. 371 of PCT/JP97/00411 filed Feb. 17, 1997.

TECHNICAL FIELD

The present invention relates to a data processing apparatus such as a microprocessor or a digital signal process (DSP), and more particularly to a technique effectively applicable to instruction buffers.

BACKGROUND ART

Along with the development of sophisticated information apparatuses including personal computers (PCs), personal digital assistants (PDAs), digital cellular units and car navigation aids in recent years, the need to reduce power consumption of large scale integrated circuits (LSIs) mounted on these apparatuses has tremendously increased. This is due to the requirements to make the batteries of portable information devices to keep their charged state longer and to suppress the costs of chip packages and cooling systems for desktop information devices. On the other hand, there are now increasingly active trends to incorporate high performance multimedia functions for processing video and audio signals and communication into information apparatuses. Thus the calculation capacity required of LSIs to execute such multimedia processing is ever increasing, and this constitutes one of the main causes of increased power consumption by LSIs.

Data processing apparatuses including microprocessors and digital signal processors (DSPs) are extensively used as LSIs for executing multimedia processing such as mentioned above. Incidentally, when these data processing apparatuses are to execute multimedia processing, generally the processing is very often to execute a loop consisting of a relatively small number of instructions, because most instances of multimedia processing are ones of digital signal processing mainly consisting of product sum calculations, which are accomplished by repeating many times (1) multiplication and (2) the addition of the result of multiplication to the cumulative sum.

In a digital signal processor, in many cases, an instruction to generate an internal state for repeated execution of a series of instructions (repeat instruction) is supported. A repeat instruction the number of the serial instructions to be executed reiteratively immediately after that and the number of times they are to be executed reiteratively. As a result, instructions to be executed many times reiteratively are executed without having to read them out of a memory (ROM, RAM or cache memory) many times. Therefore, high speed and reduced power consumption can be achieved. Examples are described in "TMS320C30 Third Generation Digital Signal Processor Users Manual" published by Texas Instruments Japan Ltd. in 1990 (hereinafter referred to as Prior Art 1) and the Gazette of the Japanese Patent Laid-open No. 293124/1992 (hereinafter referred to as Prior Art 2).

DISCLOSURE OF THE INVENTION

Digital signal processors such as those described in Prior Art 1 and Prior Art 2 presuppose, in order to save the power required for memory accessing by reiteratively reading instructions from an instruction buffer in loop processing, the availability of a repeat instruction. Accordingly there is a problem that the control method uses by digital signal processors such as those of Prior Art 1 and Prior Art 2 cannot be applied to a data processing apparatus provided with no repeat instruction.

In microprocessors of the like for general use instead of specializing in digital signal processing, a repeat instruction is not necessarily supported. In order to be provided with a repeat instruction, an instruction buffer or a repeat control circuit has to be introduced into them. Since, moreover, a repeat control circuit needs many items of hardware such as a repeat start address register, a repeat end address register, a repeat count register, a comparator and a down counter, this is based on a way of thinking that increasing the circuitry scale by introducing such a repeat control circuit is not necessarily advantageous to a microprocessor.

Further, in loop processing emerging in an actual processing, not only simple repetitions but also loops of diverse structures emerge. They include loops to which the control method of reading instructions reiteratively out of the aforementioned instruction buffer cannot be applied as a matter of principle. For instance, where a loop has a plurality of routes of which a different one is followed according to the number of repetitions of the loop, the aforementioned instruction buffer, in which only the instruction executed over the first route is stored, is incompatible with the second and subsequent loops. Therefore the microprocessor should be provided with a means to prohibit the application of control to read instructions reiteratively out of the instruction buffer depending on the structure of the loop. However, as the digital signal processors of Prior Art 1 and Prior Art 2 are provided with no such means and, on every occasion of loop processing, control to reiteratively read out instructions out of the instruction buffer is effected, they involve the problem that correct program processing cannot be accomplished when they come across a loop of a structure to which control to reiteratively read out instructions from the instruction buffer cannot be applied.

On the other hand, a technique to increase the speed or program processing by having, during the execution of loop processing, every instruction in the loop stay in a cache memory without fail is described in the Japanese Patent Laid-open No. 333929/1992 (hereinafter referred to as Prior Art 3). According to Prior Art 3, irrespective of whether or not loop processing is being executed, the cache memory operates whenever an instruction is read (unless miscaching is committed). In order to reduce the power spent in loop processing, the capacity of the cache memory itself should be reduced. However, there is the problem that, as the same small capacity memory is accessed even during non-loop processing, the hit ratio drops, making it impossible to increase the speed of program processing.

An object of the present invention is to provide a data processing apparatus provided with a control means which, in spite of the unavailability of a repeat instruction, reduces the power needed for memory accessing by reading instructions from a small scale buffer reiteratively during loop processing.

Another object of the invention is to provide a data processing apparatus provided with a means to opt to apply, or not to apply, control to read reiteratively, from a small scale buffer, instructions to be reiteratively executed during loop processing.

The aforementioned and other objects and novel features of the invention will become apparent from the description in this specification and accompanying drawings.

The following is a brief description of the typical aspects of the invention disclosed in this application.

Thus, a data processing apparatus (100, 700, 900, 1400 or 1600) for executing instructions stored in a first instruction storing means (102, 702, 902, 1402 or 1602) causes, if, as a result of the execution of an instruction to alter the content of a register (125, 742, 931, 932, 1429 or 1629) prior to a series of instructions to be executed reiteratively, the content of the register (125, 742, 931, 932, 1429 or 1629) satisfies a specific condition, a second instruction storing means (104, 704, 904, 1421 or 1621) to hold the series of instructions to be executed reiteratively and causes them to be outputted reiteratively from the second instruction storing means (104, 704, 904, 1421 or 1621) (see FIGS. 1, 5, 7, 11 and 13).

Further, the final one of the series of instructions to be executed reiteratively in the data processing apparatus (100, 700, 1400, 1600) is an instruction to cause branching to the first one of the series of instructions to be effected when a prescribed condition has come to be satisfied.

Further, the instruction to alter the content of the register (125, 1429 or 1629) in the data processing apparatus (100, 700, 1400 or 1600) is an instruction to designate the logical value of a specific bit (124, 1428 or 1628) contained in the register (125, 1429 or 1629) (see FIGS. 1, 11 and 13).

Further, in the data processing apparatus (700), the instruction to alter the content of the register (125, 1429 or 1629) is an instruction to load the number of times the execution of the series of instructions is to be repeated into the register (742) (see FIG. 5).

Further, in the data processing apparatus (100, 700 or 900), the second instruction storing means is a different instruction buffer (104, 704 or 904) from instruction queues to store a plurality of instructions to be read out of the first instruction storing means prior to execution.

Further, in the data processing apparatus (900), the instruction to alter the content of the register (931 or 932) is an instruction to load information to specify the position of the leading one and information to specify the position of the trailing one of the series of instructions to be repeated into the register (931 or 932) (see FIG. 7).

Further, in the data processing apparatus (900), that the number of the instructions to be executed reiteratively, obtained from the information to specify the position of the leading instruction and the information to specify the position of the trailing information, is not greater than a specific value corresponds to the aforementioned specific condition (see FIG. 7).

Further, in the data processing apparatus (1400 or 1600), the second instruction storing means is instruction queues (1421 or 1621) to store a plurality of instructions to be read out of the first instruction storing means prior to execution.

Further, in the data processing apparatus (100, 700, 900), the second instruction storing means (104, 704 or 904) has a memory holding circuit (1030_k_1) whose constituent elements include a first N channel type MOSFET (1103) of which the gate terminal is connected to a first node (WL-k), either one of the source and drain terminals is connected to a second node (BL-l) and the other to a third node (N1101); a second N channel type MOSFET (1104) of which the gate terminal is connected to the first node (WL-k), either one of the source and drain terminals is connected to a fourth node (BLB-l) and the other to a fifth node (N1102); a third N channel type MOSFET (1101) of which the gate terminal is connected to a fifth node (N1102), the drain terminal is connected to the third node (N1101) and the source terminal is connected to a first operating potential point (GND); and a fourth N channel type MOSFET (1102) of which the gate terminal is connected to the third node (N1101), the drain terminal is connected to the fifth node (N1102) and the source terminal is connected to the first operating potential point (GND) (see FIGS. 1, 5, 7, 8 and 9).

Further, in the data processing apparatus (100, 700 or 900), the second instruction storing means (104, 704 or 904) has an amplifying circuit (1040_1) responsive to input signals pairing the second node (BL_1) and the fourth node (BLB_1) (see FIGS. 1, 5, 7 and 8).

Further in a state in which the content of the register (1429 or 1629) does not satisfy the specific condition in the data processing apparatus (1400 or 1600), any instruction read out of the first instruction storing means (1402 or 1602) is temporarily held by the second instruction storing means (1421 or 1621) at most until it is executed once (see FIGS. 11 and 13).

For instance, the data processing apparatus (100), in order to read out an instruction reiteratively from a buffer (104) in executing a loop, has only to insert an instruction to set a specific bit (124, a buffer control flag) immediately before the execution of the bit. Therefore, it can reduce the power consumed for memory accessing by reiteratively reading the instruction out of the small scale buffer (104) when processing the loop without using a repeat instruction.

Further, unless the specific bit (124, the buffer control flag) is set, the buffer (104) is not accessed in the processing of any loop. Therefore, in order to forbid the application of the control to read an instruction out of the buffer (104) reiteratively in executing a loop, it is sufficient merely to refrain from inserting an instruction to set the specific bit (124, the buffer control flag) immediately before the execution of the loop.

BRIEF DESCRIPTION OF DRAWINGS

FIG. 1 illustrates the configuration of a data processing apparatus representing a first embodiment of the present invention (Embodiment 1).

FIG. 3 illustrates an algorithm for inserting a buffer control flag setting instruction into a program description in the data processing apparatus of Embodiment 1.

FIG. 6 illustrates an algorithm for substituting an instruction in a program distribution in the data processing apparatus of Embodiment 2.

FIG. 15 illustrates a classification of the modes of carrying out the invention.

BEST MODES FOR CARRYING OUT THE INVENTION

Figure 2A:
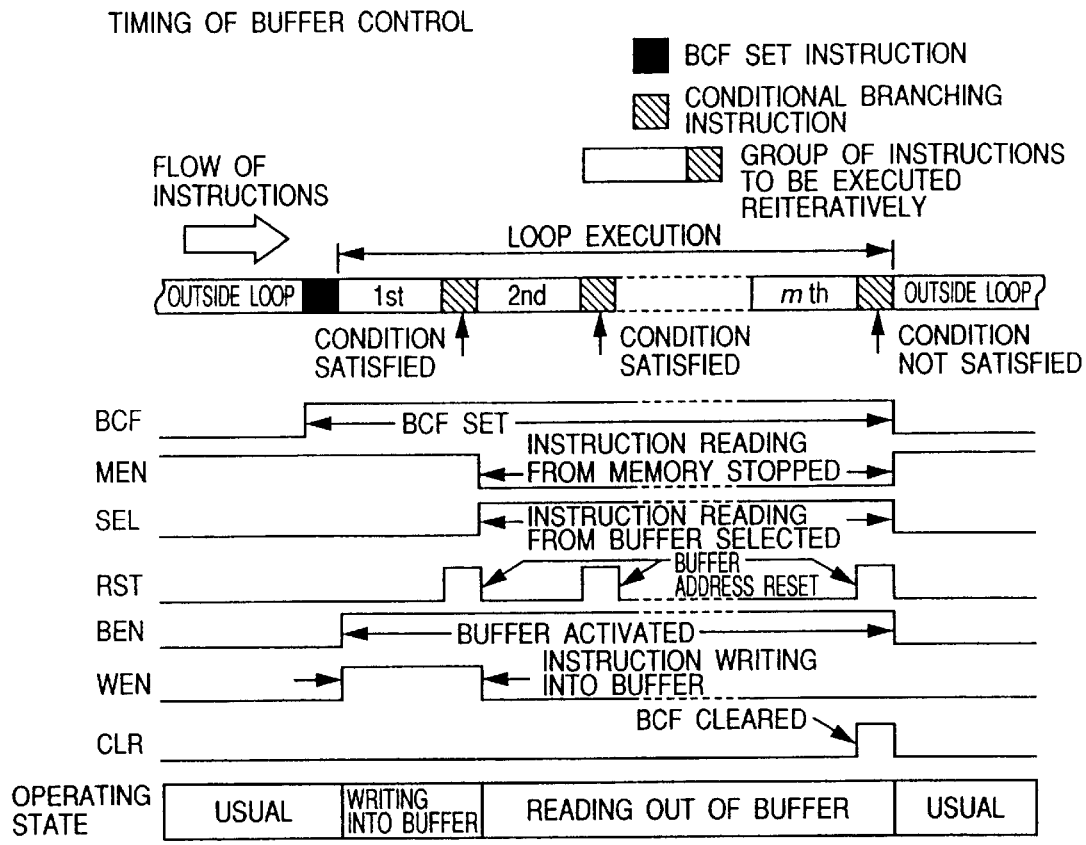
FIG. 2(a) and FIG. 2(b) illustrate the instruction reading operation of the data processing apparatus of Embodiment 1.

Embodiments of the present invention will be described in detail below with reference to drawings.

Embodiment 1

FIG. 1 illustrates the configuration of a data processing apparatus representing a first embodiment of the invention. A data processing apparatus 100 consists of a data processing section comprising a control section 120, an instruction executing section 140, a program counter 160, a buffer 104, a selector 106 and the like, and of a memory 102. The data processing apparatus 100 may either be formed over a single semiconductor substrate or only the aforementioned data processing section may be formed over a single semiconductor substrate. The control section 120 consists of an instruction decoder 122, a control register 125, a buffer control circuit 126 and the like. To add, instruction fetch queues(instruction pre-reading buffers) may as well be provided either within the instruction decoder 122 or between the selector 106 and the instruction decoder 122.

The memory 102 is, for example, either a read only memory (ROM) or random access memory (RAM) as a main storage or a cache memory for holding some of the instructions to be stored into the main storage. The ROM may consist of, for instance, either a mask ROM programmed in a semiconductor manufacturing process or an electrically rewritable non-volatile memory such as a flash memory. The RAM may consist of, for instance, a static random access memory (SRAM), a dynamic random access memory (DRAM), or a ferroelectric memory (an electrically rewritable nonvolatile whose write cycle and read cycle are substantially equal). The cache memory may be composed in a full associative or a set associative system.

Incidentally, the output S162 of the program counter 160 may be supplied to the memory 102 via an address bus.

In this embodiment, control to read instructions reiteratively out of the buffer 104 when a loop, wherein the trailing one of a group of instructions to be executed reiteratively constitutes a conditional branching instruction to the leading instruction. Therefore it utilizes no repeat instruction. An outline of the operation of the data processing apparatus 100 to execute a group of instructions reiteratively will be presented below.

(1) Immediately before the execution of a loop to which control to read instructions reiteratively out of the buffer 104, an instruction to set a specific bit 124 (buffer control flag) is executed. From immediately after the setting of the specific bit 124 (buffer control flag) onward, the instructions read out of the memory 102 are successively written into the buffer 104 while being put to execution. The process goes on to (2).

(2) After the bit 124 (buffer control flag) is set, the conditional branching instruction (trailing instruction) is first read, and the process goes on to (3) if that condition is satisfied, or to (5) if it is not satisfied.

(3) Accessing to the memory 102 is stopped, and the instructions stored in the buffer 104 are read successively, beginning with the leading one. The process goes on to (4).

(4) The conditional branching instruction (trailing instruction) is read, and the process goes on to (3) if that condition is satisfied, or to (5) if it is not satisfied.

(5) Accessing to the memory 102 is stopped, and usual reading of instructions out of the memory 102 is started. The bit 124 (buffer control flag) is cleared.

By the process described above, no repeat instruction is used, but instructions are read reiteratively out of the small buffer 104 and the memory 102 is prevented from being accessed during loop processing. Further, unless the bit 124 (buffer control flag) is set, no accessing to the buffer 104 takes place during the processing of any loop. Therefore, in order to forbid the application of control to read instructions reiteratively out of the buffer 104 when a given loop is to be executed, it is sufficient merely to refrain from inserting an instruction to set the bit 124 (buffer control flag) immediately before the execution of the loop.

Next will be presented an example of loop in which the trailing one of a group of instructions to be executed reiteratively constitutes a conditional branching instruction to the leading instruction.

In order, for example, to execute n (n is a positive integer) instructions (inst(1), inst(2), . . . , inst(n)) m times (m is a positive integer), the program is encoded as follows.

gr0←km;
LOOP: inst(1);
 inst(2);
 .
 .
 .
 inst(n);
 gr0←gr0−1;
 if NZ goto LOOP;

Here "gr0←m" denotes the setting of the number of loop repeats into a register (gr0, provided in the instruction executing section for example). "gr0←gr0−1" denotes a decrement of the number of loop repeats. "if NZ goto LOOP" is a conditional branching instruction to cause branching to the leading instruction (inst(1)) of the loop if the result of calculating the decrement of the number of loop repeats, performed immediately before, is not 0 (NZ: Not Zero), i.e. the loop has not yet been completed.

When this loop is executed, the buffer 104 is caused to hold the instructions, and to have the instructions reiteratively read out of this buffer 104, an instruction (set BCF) to set the buffer control flag 124 (BCF) in the control register 125 is inserted before the leading instruction (inst(1)) of the loop as follows.

gr0←m;
 set BCF;
LOOP: inst(1);
 inst(2);
 .
 .
 .
 inst(n);
 gr0←gr0−1;
 if NZ goto LOOP;

FIG. 2 illustrates the operation to read instructions which takes place when the data processing apparatus 100 processes the above-described loop. The operation of the data processing apparatus 100 will be described below with reference to FIG. 2.

Figure 2B:
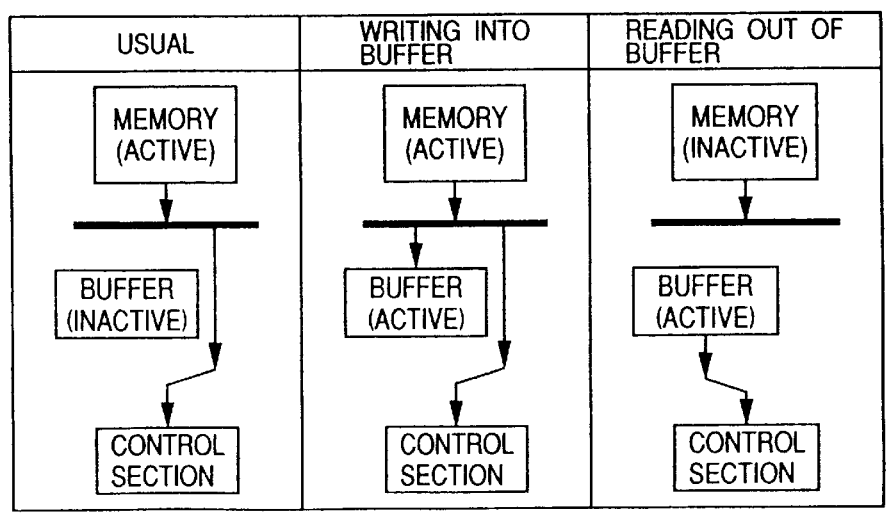

The instruction reading operation of the data processing apparatus 100 has the following three states of operation (see FIG. 2(b)).

(1) "Usual" State

An instruction read out of the memory 102 in accordance with the count of the program counter 160 is delivered as it is to the control section 120 via the output S101 of the memory and a bus S102. The buffer 104 is at halt. The selector 106 is caused by a selection signal SEL to select a signal of an output S103 from the bus S102.

(2) State of "Writing Into Buffer"

The instruction read out of the memory 102 is successively written into the buffer 104 at the same time as being delivered to the control section 120. The selector 106 is caused by the selection signal SEL to select the signal of the output S103 from the bus S102.

(3) State of "Reading Out of Buffer"

The instruction read out of the memory 102 is delivered to the control section 120. The buffer 104 is at halt. The selector 106 is caused by the selection signal SEL to select a signal of an output S104 from the buffer 104.

As illustrated in FIG. 2(a), when the buffer control flag 124 (BCF) is not set, the data processing apparatus 100 reads instruction in the "usual" state. Once an instruction (set BCF) to set the buffer control flag 124 (BCF) is executed, instructions are read in accordance with the following rules.

(i) Immediately after the buffer control flag 124 (BCF) is set, a shift to the state of "writing into buffer" takes place.

(ii) When the conditional branching instruction (if NZ goto LOOP) is read in the state of "writing into buffer," (iii) will be followed if the condition is satisfied, or (v) will be followed if it is not satisfied.

(iii) A shift to the state of "reading out of buffer" takes place. Instructions stored in the buffer 104 are sequentially read beginning with the leading one. If the conditional branching instruction (if NZ goto LOOP) is read, (iv) will be followed.

(iv) If the condition is satisfied, (iii) will be followed, or if not, (v) will be followed.

(v) A shift to the "usual" state takes place. The buffer control flag 124 (BCF) is cleared by a buffer control clear signal CLR.

In order to perform the actions of (i) through (v), the buffer control circuit 126 issues the following control signals to the memory 102, buffer 104, selector 106 and buffer control flag 124 (BCF) on the basis of an output S126 from the buffer control flag 124 (BCF) and branching information S123 (information concerning the detection of a conditional branching instruction and on the satisfaction or non-satisfaction of the condition) from the instruction decoder 122.

(a) Memory Enable Signal MEN:

This signal causes the memory 102 to be instructed to operate or stop. When at a "LOW" level, the signal causes the memory 102 to stop in the state of "reading out of buffer." When at a "HIGH" level, it causes the memory 102 to operate. This signal may as well be used as a memory access request signal.

(b) Selector Control Signal SEL:

This signal causes the selector 106 to be controlled. When at a "HIGH" level, it causes the output S104 from the buffer to be selected in the state of "reading out of buffer." When at a "LOW" level, it causes the output S103 from the bus 102 to be selected.

(c) Pointer Reset Signal RST:

This signal causes the pointer of the buffer 104 to be returned to the start position. It is caused to be activated ("HIGH" level) when the conditional branching instruction is read in either the state of "writing into buffer" or the state of "reading out of buffer."

(d) Buffer Enable Signal BEN:

This signal causes the buffer 104 to be instructed to operate or stop. In either the state of "writing into buffer" or the state of "reading out of buffer," it is turned "HIGH" and causes the buffer 104 to be operated.

(e) Write Enable Signal WEN:

This signal causes an instruction to be given to write into or read out of the buffer 104. In the state of "writing into buffer," it is turned "HIGH" and caused to instruct writing.

(f) Buffer Control Flag Clear Signal CLR:

When the condition of the conditional branching instruction is not satisfied, this signal is caused to clear the buffer control flag 124 (BCF).

Thus, this embodiment can reduce the power consumed for memory accessing by reiteratively reading instructions out of the small scale buffer 104 when processing a loop without using a repeat instruction. To add, the buffer control circuit 126 can be realized with a very small scale sequential circuit.

In this embodiment, unless the buffer control flag 124 (BCF) is set, no accessing to the buffer 104 takes place during the processing of any loop. Therefore, in order to forbid the application of control to read instructions reiteratively out of the buffer 104 when a given loop is to be executed, it is sufficient merely to refrain from inserting an instruction to set (set BCF) the bit 124 (buffer control flag) immediately before the execution of the loop (immediately before inst(1) in the above-cited example).

Next, in order to apply control to read instructions reiteratively out of the buffer 104 to only small scale loops which involve no flow control instructions, such as a branching instruction, except the trailing instruction (hereinafter referred to as "simple reiterative loops") and whose number of constituent instructions is not greater than the maximum number of instructions the buffer 104 can accommodate, a buffer control flag set instruction (set BCF) is inserted into the program description in accordance with an algorithm shown in FIG. 3. The algorithm shown in FIG. 3 will be explained below.

(1) One instruction is referred to (S1).

(2) If the instruction satisfies all of the following conditions A through D, processing under (3) is performed. In any other case, (4) is followed (S21, S22, S23, S24).

Condition A: The instruction referred to is a conditional branching instruction (if NZ goto loop in the example cited above).

Condition B: (Address of branching destination)<(Address of conditional branching instruction).

Condition C: (Number of instructions from instruction on branching destination to conditional branching instruction) ≦(Maximum number of instructions buffer 104 can accommodate), n+2≦(Maximum number of instructions buffer 104 can accommodate) in the above-cited example.

Condition D: Between the instruction on the branching destination and the conditional branching instruction (from inst(1) to if NZ goto LOOP in the above-cited example), there is no other flow control instruction (branching instruction or the like) than the instruction referred to (if NZ goto LOOP in the above-cited example).

(3) The buffer control flag set instruction (set BCF) is inserted immediately before the instruction on the branching destination (inst(1) in the above-cited example) (S3).

(4) The object of reference is shifted to the next instruction (S4).

If the above-described algorithm is built into an object code generating tool, such as a compiler or an assembler, in advance, the programmer can encode the program (source code) as usual without being conscious of the presence of the buffer 104. Further, if the objects of application control to read instructions reiteratively out of the buffer 104 to only small scale simple reiterative loops as stated above, a considerable effect to save power consumption can be expected.

Figure 4:
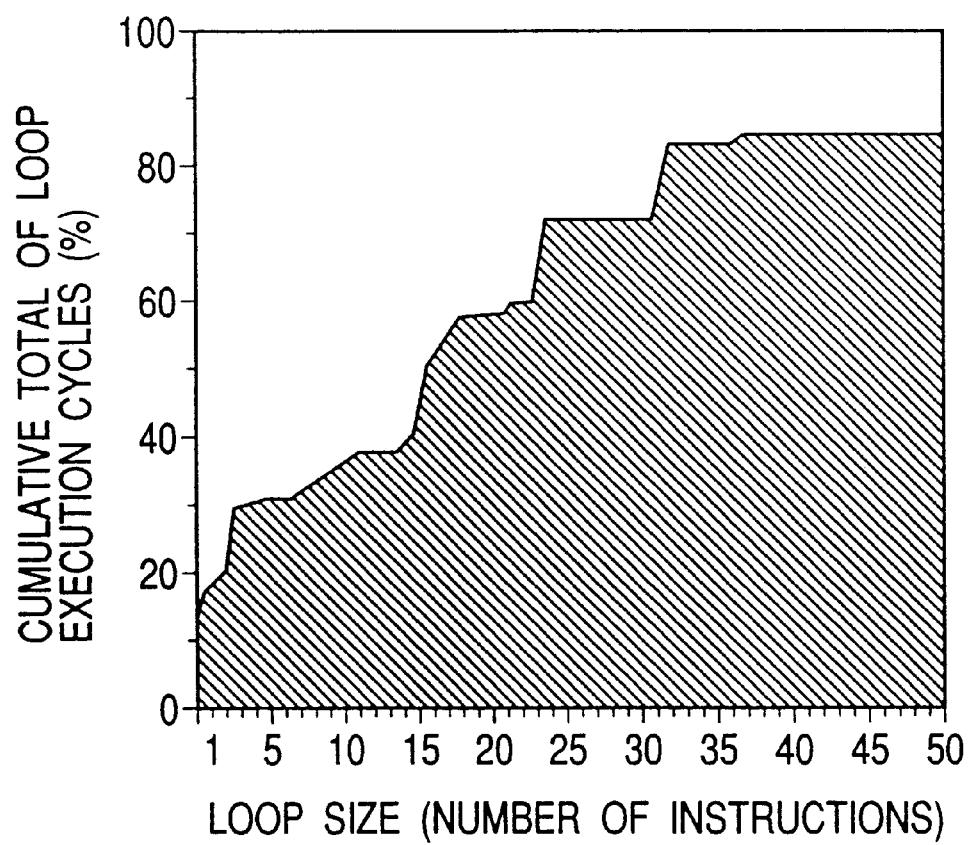
FIG. 4 illustrates a loop size distribution in the execution of a voice encoding/decoding program in a certain data processing apparatus.

FIG. 4 illustrates a simple reiterative loop size distribution in the execution of a voice encoding/decoding program. The horizontal axis represents the loop size (number of instructions), and the vertical axis, the cumulative number of cycles of loop execution (%). When the data processing apparatus 100 executes a voice encoding/decoding program, about 60% of the total execution cycles consists of simple reiterative loops each consisting of 20 or fewer steps. That is to say, if the buffer 104 has a capacity to accommodate up to 20 instructions, about 60% of the total execution cycles can be prevented from accessing the memory 102. Further, if the capacity of the buffer 104 is expanded to 32 instructions, about 80% of the cycles can be covered.

Embodiment 2

Figure 5:
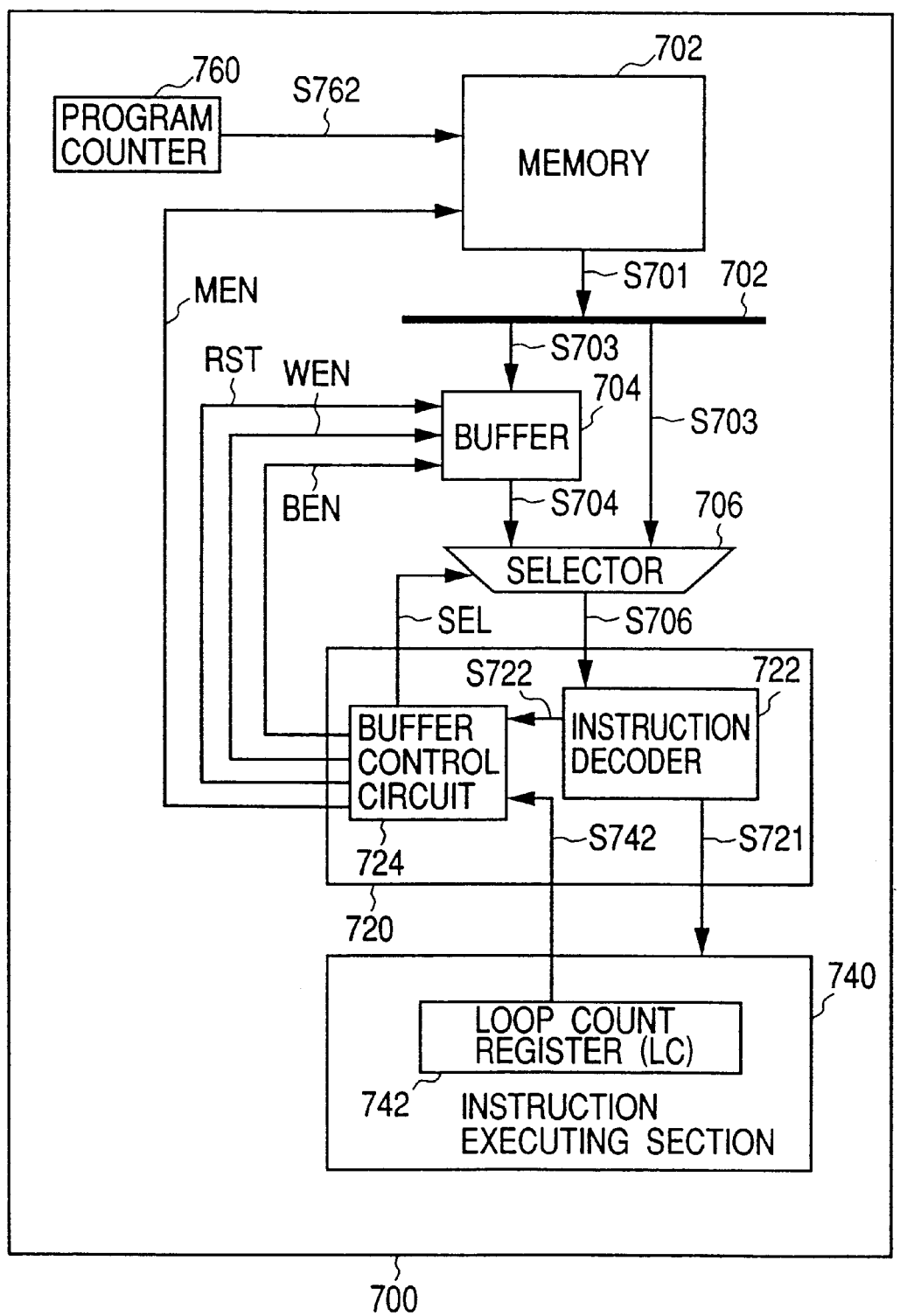
FIG. 5 illustrates the configuration of a data processing apparatus representing a second embodiment of the invention (Embodiment 2).

FIG. 5 illustrates the configuration of a data processing apparatus representing a second embodiment of the present invention. A data processing apparatus 700 consists of a data processing section comprising a control section 720, an instruction executing section 740, a program counter 760, a buffer 704, a selector 706 and the like, and of a memory 702. The data processing apparatus 700 may either be formed over a single semiconductor substrate or only the aforementioned data processing section may be formed over a single semiconductor substrate. The control section 720 consists of an instruction decoder 722, a buffer control circuit 724 and the like. To add, instruction fetch queues (instruction pre-reading buffers) may as well be provided either within the instruction decoder 722 or between the selector 706 and the instruction decoder 722.

The memory 702 is, for example, either a read only memory (ROM) or random access memory (RAM) as a main storage or a cache memory for holding some of the instructions to be stored into the main storage. The ROM may consist of, for instance, either a mask ROM programmed in a semiconductor manufacturing process or an electrically rewritable non-volatile memory such as a flash memory. The RAM may consist of, for instance, a static random access memory (SRAM), a dynamic random access memory (DRAM), or a ferroelectric memory (an electrically rewritable non-volatile whose write cycle and read cycle are substantially equal).

Incidentally, the output S762 of the program counter 760 may be supplied to the memory 702 via an address bus.

The data processing apparatus 700 is provided with a loop count register 742 (LC) in place of the buffer control flag 124 (BCF) which the data processing apparatus 100 was provided with.

The data processing apparatus 700 is provided with no repeat instruction either. Accordingly, in order, for example, to execute n (n is a positive integer) instructions (inst(1), inst(2), . . . , inst(n)) m times (m is a positive integer), the program is encoded as follows.

gr0←m;
LOOP: inst(1);
 inst(2);
 .
 .
 .
 inst(n);
 gr0←gr0−1;
 if NZ goto LOOP;

Here "gr0←m" denotes the setting of the number of loop repeats into a general purpose register (gr0, provided in the instruction executing section for example). "gr0←gr0−1" denotes a decrement of the number of loop repeats. "if NZ goto LOOP" is a conditional branching instruction to cause branching to the leading instruction (inst(1)) of the loop if the result of calculating the decrement of the number of loop repeats, performed immediately before, is not 0 (NZ: Not Zero), i.e. the loop has not yet been completed.

When this loop is executed, the buffer 704 is caused to hold the instructions, and to have the instructions reiteratively read out of this buffer, the number of loop repeats is counted using the loop count register 742 (LC) instead of the register (gr0) as follows.

LC←m;
LOOP: inst(1);
 inst(2);
 .
 .
 .
 inst(n);
 LC←LC−1;
 if NZ goto LOOP;

The instruction reading operation accomplished when the data processing apparatus 700 processes the above-described loop will be explained below. The data processing 700, like the data processing apparatus 100, three states of operation including "usual," "writing into buffer" and "reading out of buffer" states (see FIG. 2(b)). The initial count of the loop count register 742 (LC) is 0. When the count of the loop count register 724 (LC) is 0, the data processing apparatus 700 reads instructions in the "usual" state. When the number of times the loop is to be repeated (any other value than 0) is loaded into the loop count register 742 (LC) (LC←m), instructions are read in accordance with the following rules.

(i) Immediately after the non-0 value is loaded into the loop count register 742 (LC), a shift to the state of "writing into buffer" takes place.

(ii) When the conditional branching instruction (if NZ goto LOOP) is read in the state of "writing into buffer," (iii) will be followed if the condition is satisfied, or (v) will be followed if it is not satisfied.

(iii) A shift to the state of "reading out of buffer" takes place. Instructions stored in the buffer 704 are sequentially read beginning with the leading one. If the conditional branching instruction (if NZ goto LOOP) is read, (iv) will be followed.

(iv) If the condition is satisfied, (iii) will be followed, or if not, (v) will be followed.

(v) A shift to the "usual" state takes place.

In order to perform the actions of (i) through (v), the buffer control circuit 724 issues the following control signals to the memory 702, buffer 704, and selector 706 on the basis of an output S742 from the loop count register 742 (LC) and branching information S722 (information concerning the detection of a conditional branching instruction and on the satisfaction or non-satisfaction of the condition) from the instruction decoder 722.

(a) Memory Enable Signal MEN:

This signal causes the memory 702 to be instructed to operate or stop. When at a "LOW" level, the signal causes the memory 702 to stop in the state of "reading out of buffer." When at a "HIGH" level, it causes the memory 702 to operate. This signal may as well be used as a memory access request signal.

(b) Selector Control Signal SEL:

This signal causes the selector 706 to be controlled. When at a "HIGH" level, it causes the output S704 from the buffer to be selected in the state of "reading out of buffer." When at a "LOW" level, it causes the output S703 from the bus 702 to be selected.

(c) Pointer Reset Signal RST:

This signal causes the pointer of the buffer 704 to be returned to the start position. It is caused to be activated ("HIGH" level) when the conditional branching instruction is read in either the state of "writing into buffer" or the state of "reading out of buffer."

(d) Buffer Enable Signal BEN:

This signal causes the buffer 704 to be instructed to operate or stop. In either the state of "writing into buffer" or the state of "reading out of buffer," it is turned "HIGH" and causes the buffer 704 to be operated.

(e) Write Enable Signal WEN:

This signal causes an instruction to be given to write into or read out of the buffer 704. In the state of "writing into buffer," it is turned "HIGH" and caused to instruct writing.

Thus, this embodiment can reduce the power consumed for memory accessing by reiteratively reading instructions out of the small scale buffer 704 when processing a loop without using a repeat instruction. To add, the buffer control circuit 724 can be realized with a very small scale sequential circuit.

In this embodiment, unless a non-0 value is loaded (if 0 is loaded) into the loop counter register 742 (LC) is set, no accessing to the buffer 704 takes place during the processing of any loop. Therefore, in order to forbid the application of control to read instructions reiteratively out of the buffer 704 when a given loop is to be executed, it is sufficient merely to refrain from using the loop count register 742 (LC) for counting the number of loop repetitions (the register gr0 or the like may be used).

Next, in order to apply control to read instructions reiteratively out of the buffer 704 to only small scale loops whose number of constituent instructions is not greater than the maximum number of instructions the buffer 704 can accommodate, the register to be used for counting the number of loop repetitions is altered to the loop count register 742 (LC) in accordance with an algorithm shown in FIG. 6.

(1) One instruction is referred to (S10).

(2) If the instruction satisfies all of the following conditions A through F, processing under (3) is performed. In any other case, (4) is followed (S201, S202, S203, S204, S205, S206).

Condition A: The instruction referred to is a conditional branching instruction (if NZ goto loop in the example cited above).

Condition B: (Address of branching destination)<(Address of conditional branching instruction).

Condition C: (Number of instructions from instruction on branching destination to conditional branching instruction) ≦(Maximum number of instructions buffer 704 can accommodate), n+2≦(Maximum number of instructions buffer 704 can accommodate) in the above-cited example.

Condition D: Between the instruction on the branching destination and the conditional branching instruction (from inst(1) to if NZ goto LOOP in the above-cited example), there is no other flow control instruction (branching instruction or the like) than the instruction referred to (if NZ goto LOOP in the above-cited example).

Condition E: The instruction immediately before the branching destination is an instruction into a certain register (gr0←m in the above-cited example.

Condition F: The instruction immediately before the conditional branching destination is an instruction to decrement the count of the register (gr0←gr0−1).

(3) The operands of the above-mentioned load instruction and decrement instruction are substituted into the loop count register 742 (LC) (S30).

(4) The object of reference is shifted to the next instruction (S40).

If the above-described algorithm is built into an object code generating tool, such as a compiler or an assembler, in advance, the programmer can encode the program (source code) as usual without being conscious of the presence of the buffer 704.

Embodiment 3

Figure 7:
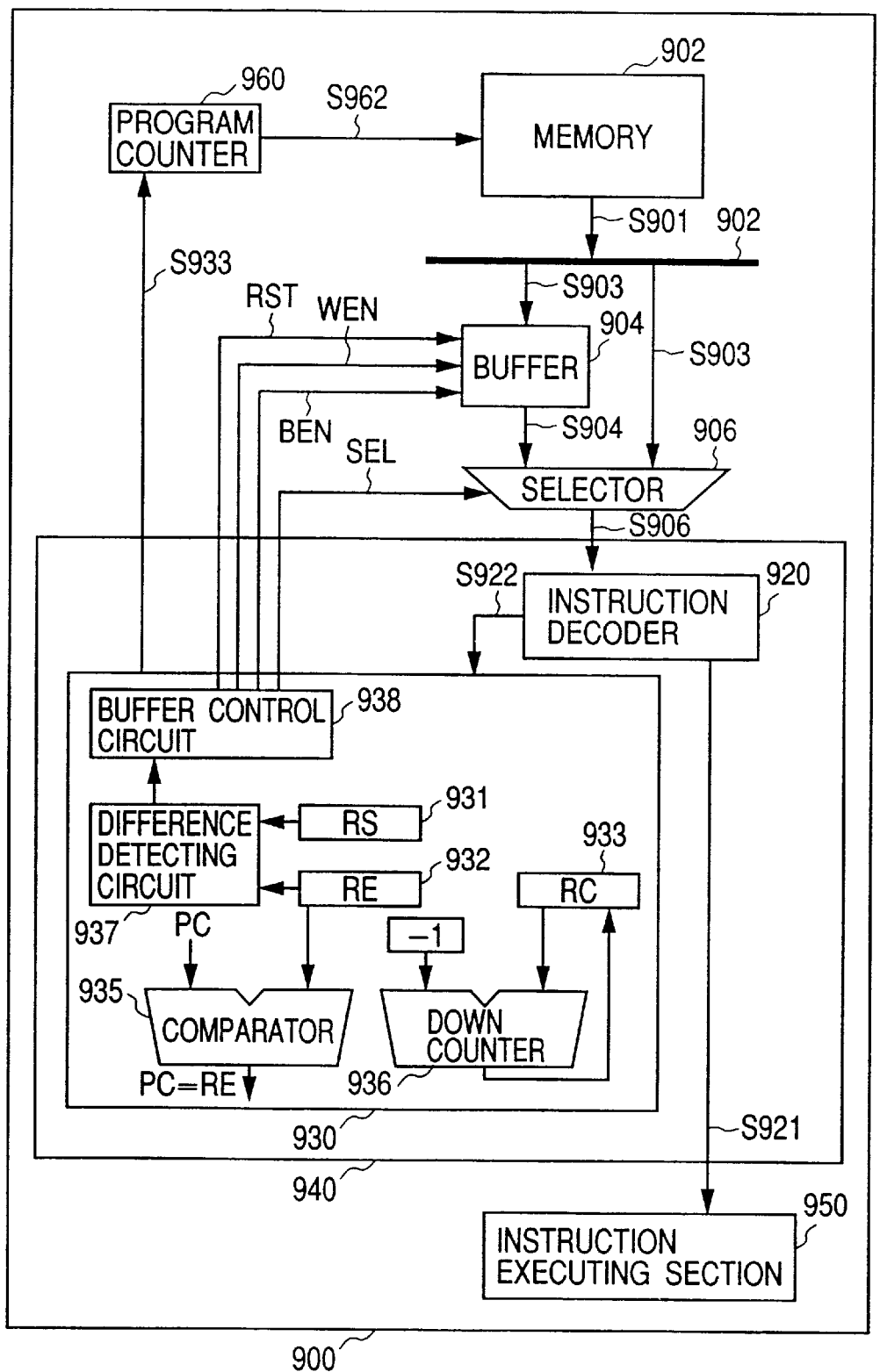
FIG. 7 illustrates the configuration of a data processing apparatus representing a third embodiment of the invention.

FIG. 7 illustrates the configuration of a data processing apparatus representing a third embodiment of the invention. A data processing apparatus 900 consists of a data processing section comprising a control section 940, an instruction executing section 950, a program counter 960, a buffer 904, a selector 906 and the like, and of a memory 902. The data processing apparatus 900 may either be formed over a single semiconductor substrate or only the aforementioned data processing section may be formed over a single semiconductor substrate. The control section 940 consists of an instruction decoder 920, a repeat control section 930 and the like. To add, instruction fetch queues (instruction pre-reading buffers) may as well be provided either within the instruction decoder 920 or between the selector 906 and the instruction decoder 920.

The memory 902 is, for example, either a read only memory (ROM) or random access memory (RAM) as a main storage or a cache memory for holding some of the instructions to be stored into the main storage. The ROM may consist of, for instance, either a mask ROM programmed in a semiconductor manufacturing process or an electrically rewritable non-volatile memory such as a flash memory. The RAM may consist of, for instance, a static random access memory (SRAM), a dynamic random access memory (DRAM), or a ferroelectric memory (an electrically rewritable non-volatile whose write cycle and read cycle are substantially equal).

Incidentally, the output S962 of the program counter 960 may be supplied to the memory 902 via an address bus.

In this embodiment, the data processing apparatus 900 is provided with a repeat instruction. The repeat control section 930 is provided with a repeat start address register 931 (RS), repeat end address register 932 (RE), repeat count register 933 (RC), comparator circuit 935, down counter 936, difference detecting circuit 937 and buffer control circuit 938.

In order, for example, to execute n (n is a positive integer) instructions (inst(1), inst(2), . . . , inst(n)) m times (m is a positive integer), the program is encoded as follows.

RS←START;
RE←END;

RC←m;
RPT;
START: inst(1);
　inst(2);
　.
　.
　.
END: inst(n);

Here "RS←START" denotes an instruction to load the address (START) of the leading one (inst(1)) of a series of instructions to be executed reiteratively into the repeat start address register 931 (RS). "RS←END" denotes an instruction to load the address (END) of the trailing one (inst(n)) of a series of instructions to be executed reiteratively into the repeat end address register 932 (RE). "RC←m" denotes an instruction to load the required number (m) of repeats of execution into the repeat count register 933 (RC). "RPT" is an instruction to generate an internal state for reiterative execution of instructions (repeat instruction).

When the repeat instruction (RPT) is executed, the content of the repeat end address register 932 (RE) and the program counter (PC) are compared by the comparator circuit 935. If they are found identical and the content of the repeat count register 933 (RC) is not 1, the repeat count register 933 (RC) is counted down by 1 by the down counter 936, and the count of the program counter 960 is replaced by the count of the repeat start address register 931 (RS) to continue processing. If the content of the repeat end address register 932 (RE) and the program counter (PC) are found identical and the content of the repeat count register 933 (RC) not 1, the repeat state is discontinued. If it is desired to keep the count of the repeat count register 933 (RC) in the non-repeat state at 0 all the time, control to clear the count of the repeat count register 933 (RC) can be effect at this point of time. To add, RS←START, RS←END, RC←m and RPT need not be four separate instruction codes. It is also possible to describe the aforementioned four instruction codes collectively in a single instruction code. It is also possible to integrate RC←m and RPT into a repeat instruction RC←m.

The data processing apparatus 900 performs control to read instructions reiteratively from the small scale buffer 904 during reiterative execution of instructions by a repeat instruction. However, if it is attempted to store such a large loop that the number of instructions constituting the loop exceeds the maximum number of instructions that can be accommodated by the buffer 904 into the buffer 904 as it is, proper loop processing is made impossible because instructions in the final part of the loop will be overwritten into a place where instructions are already stored.

The simplest way to avert this problem is to forbid the application of control to read instructions reiteratively from the buffer 904 to loops larger than the size of the buffer 904. In the data processing apparatus 900, this is realized in the following manner. The difference detecting circuit 937 calculates the number of instructions constituting a loop (n in the above-cited example) from the difference between the counts of the repeat start address register 931 (RS) and of the repeat end address register 932 ($#). If the number of instructions constituting the loop (n in the above-cited example) surpasses the maximum number of instructions that can be accommodated by the buffer 904, the difference detecting circuit 937 instructs the buffer control circuit 938 to forbid access to the buffer 904, and causes instructions to be read out of the memory 902 as usual.

Thus, this embodiment can forbid the application of control to read instructions reiteratively from the buffer 904 if the number of instructions constituting the loop surpasses the maximum number of instructions that can be accommodated by the buffer 904.

To add, although the positional information on the leading and trailing ones of the series of instructions to be executed reiteratively in this embodiment is supposed to be the physical addresses in which they are stored, it may be expressed in some other form, such as relative addresses. Or it may be the aforementioned number of instructions (number of steps) to be executed reiteratively, which can be figured out from the positional information on the leading and trailing ones of the series of instructions to be executed reiteratively.

(Configuration of the Buffer)

Figure 8:
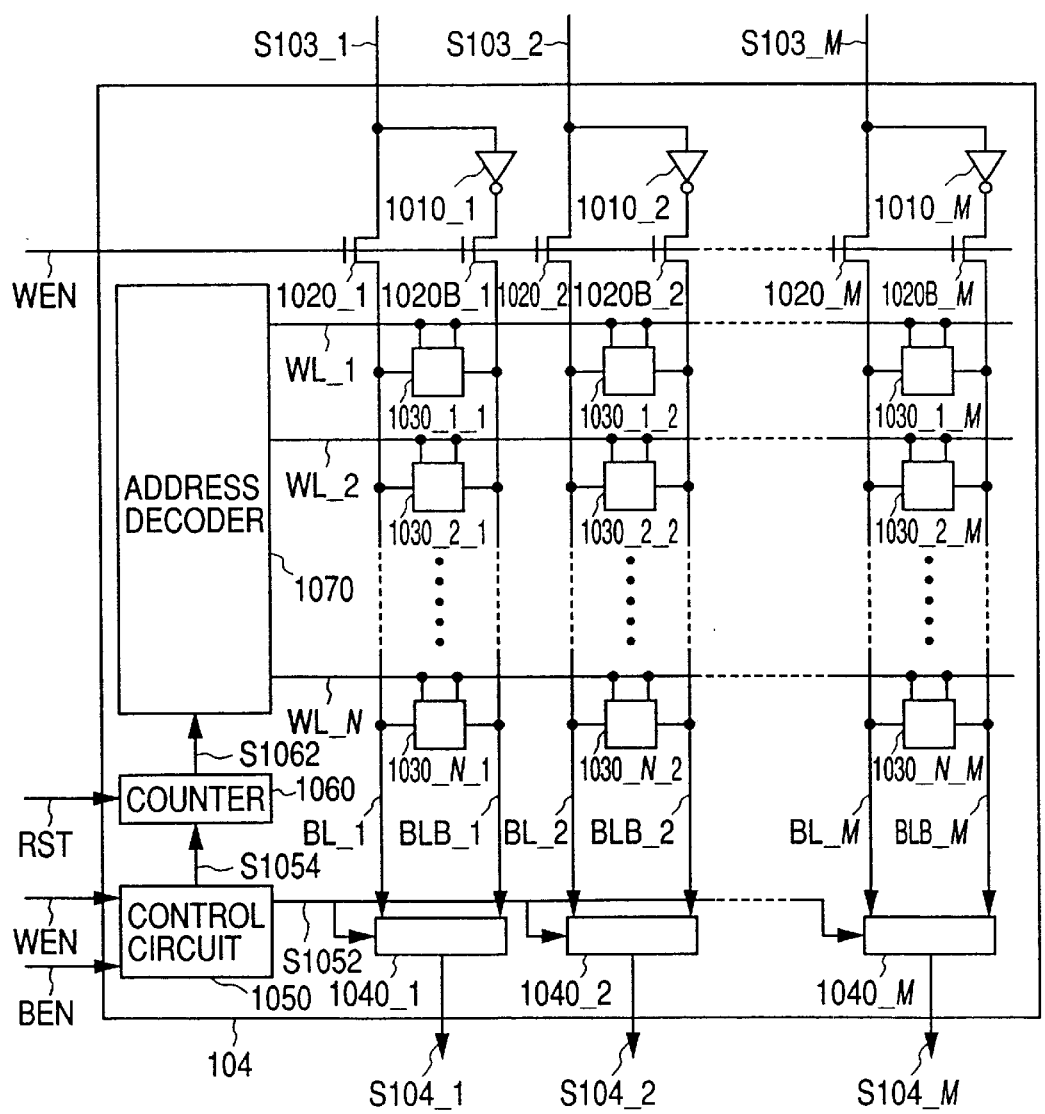
FIG. 8 illustrates the configuration of a buffer included in the data processing apparatus of Embodiment 1.

FIG. 8 illustrates one example of configuration of the buffer 104 the data processing apparatus 100 is provided with. In this embodiment, the buffer 104 is composed of a memory circuit. An instruction code S103 is supposed to be M bits wide, and the maximum number of instructions the buffer 104 can accommodate is supposed to be N. Thus instructions are stored in a memory array of N words×M bits. Each bit in the instruction code is stored into a memory cell 1030_k_l (where k=1, 2, . . . ,N, l=1, 2, . . . , M).

A counter 1060 counts up by 1 at a time an address S1062 given to an address decoder 1070. When the pointer reset signal RST from the buffer control circuit 126 is activated, the counter 1060 returns the address S1062 to the start position.

The address decoder 107 decodes the address S1062 given by the counter 1060, and selects a matching one of word lines WL_k (k=1, 2, . . . , N).

During a writing action, instruction codes S103_l (l=1, 2, . . . , M) are written into memory cells selected by the word lines via drain-source routes of transistors 1020_l (l=1, 2, . . . , M).

During a reading action, small amplitude complementary signals emerging on bit line pairs (BL_1, BLB_1, . . . , BL_M, BLB_M) from memory cells selected by word lines are taken out as output signals S104_l (l=1, 2, . . . , M) by amplifying circuits 1040_l (l=1, 2, . . . , M).

Figure 9:
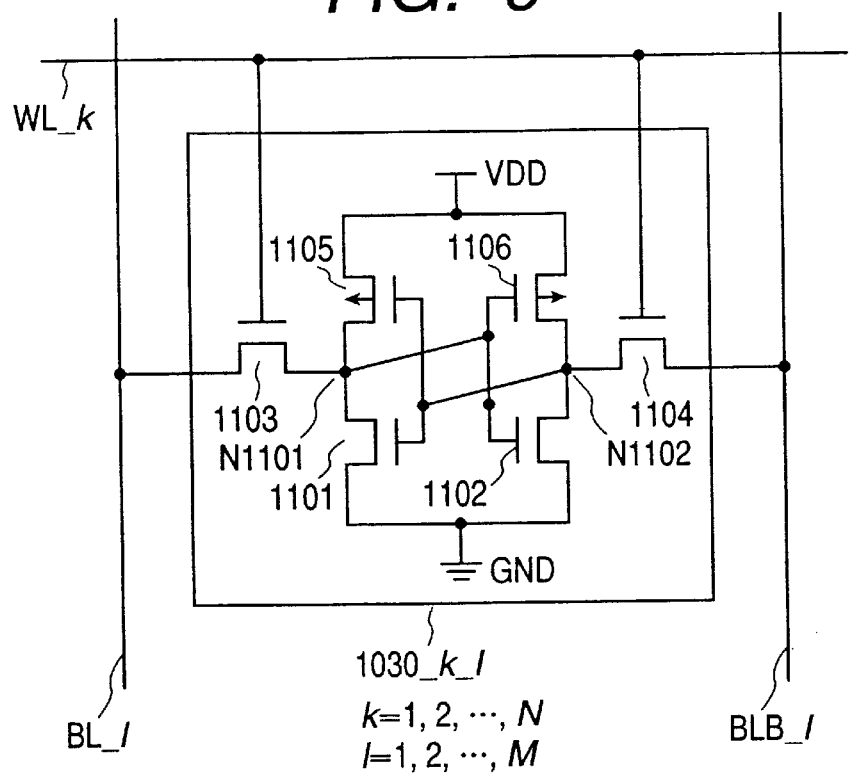
FIG. 9 illustrates the configuration of a memory cell included in the buffer.
Figure 10:
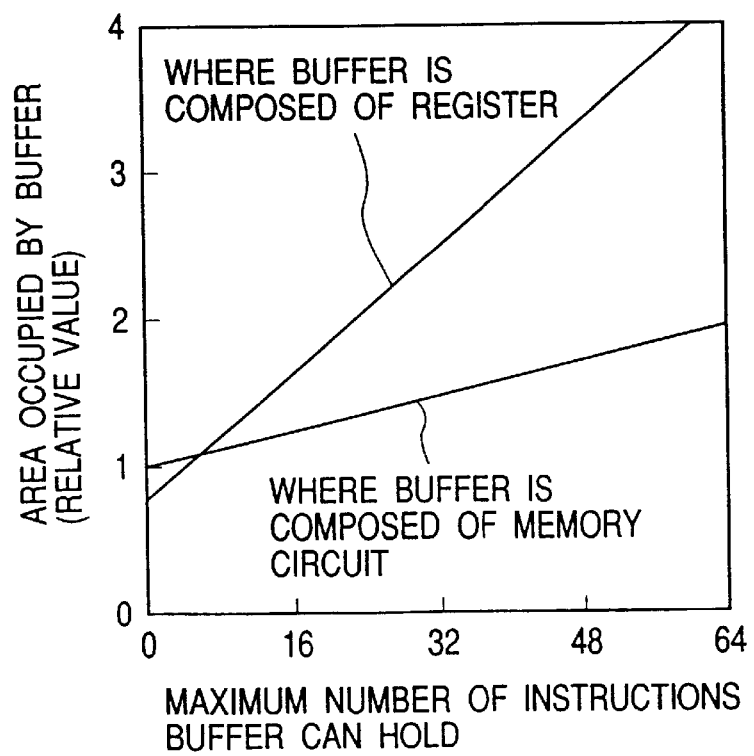
FIG. 10 compares areas occupied by a buffer.

One example of configuration of the memory cell 1030_k_l (where k=1, 2, . . . , N, l=1, 2, . . . , M) is illustrated in FIG. 9. The memory cell 1030_k_l (where k=1, 2, . . .,N, l=1, 2, . . . , M) is composed of a so-called 6 MOS transistor SRAM. Transistors 1105 and 1106 are P channel type MOS transistors (P channel type MOSFETs). Transistors 1101, 1102, 1103 and 1104 are N channel MOS transistors (N channel type MOSFETs). "VVD" denotes the source voltage, and "GND" the grounding voltage.

The buffer configuration of this embodiment is applicable not only to the data processing apparatus 100 but also to the data processing apparatuses 700 and 900.

The composition of the buffer 104 of a memory circuit has the advantage over the composition using a register that, especially where the number of instructions to be stored in the buffer is relatively large, that the area occupied by the buffer can be reduced, because, where the buffer is composed of a memory circuit, minute signals would suffice as the signals to be read out of the memory cells 1030_k_l (where k=1, 2, . . .,N, l=1, 2, . . . , M) to the bit line pairs (BL_1, BLB_1, . . . , BL_M, BLB_M), so that the memory cells' own current drive power need not be large and accordingly the dimensions of elements to constitute the memory cells can be reduced.

Embodiment 4

In a high speed microprocessor, instruction queues (instruction pre-reading buffers) for temporarily holding a plurality of instructions until the instructions taken out of a memory (e.g. a cache memory) are delivered to an instruction decoder is provided in the control section. As instructions are delivered from the instruction queues to the instruction decoder, further instructions are taken into the instruction queues from the memory to minimize vacancy if any. It was studied if these instruction queues could be let function a s the buffer 104 of the data processing apparatus 100. An embodiment of the result will be described below.

Figure 11:
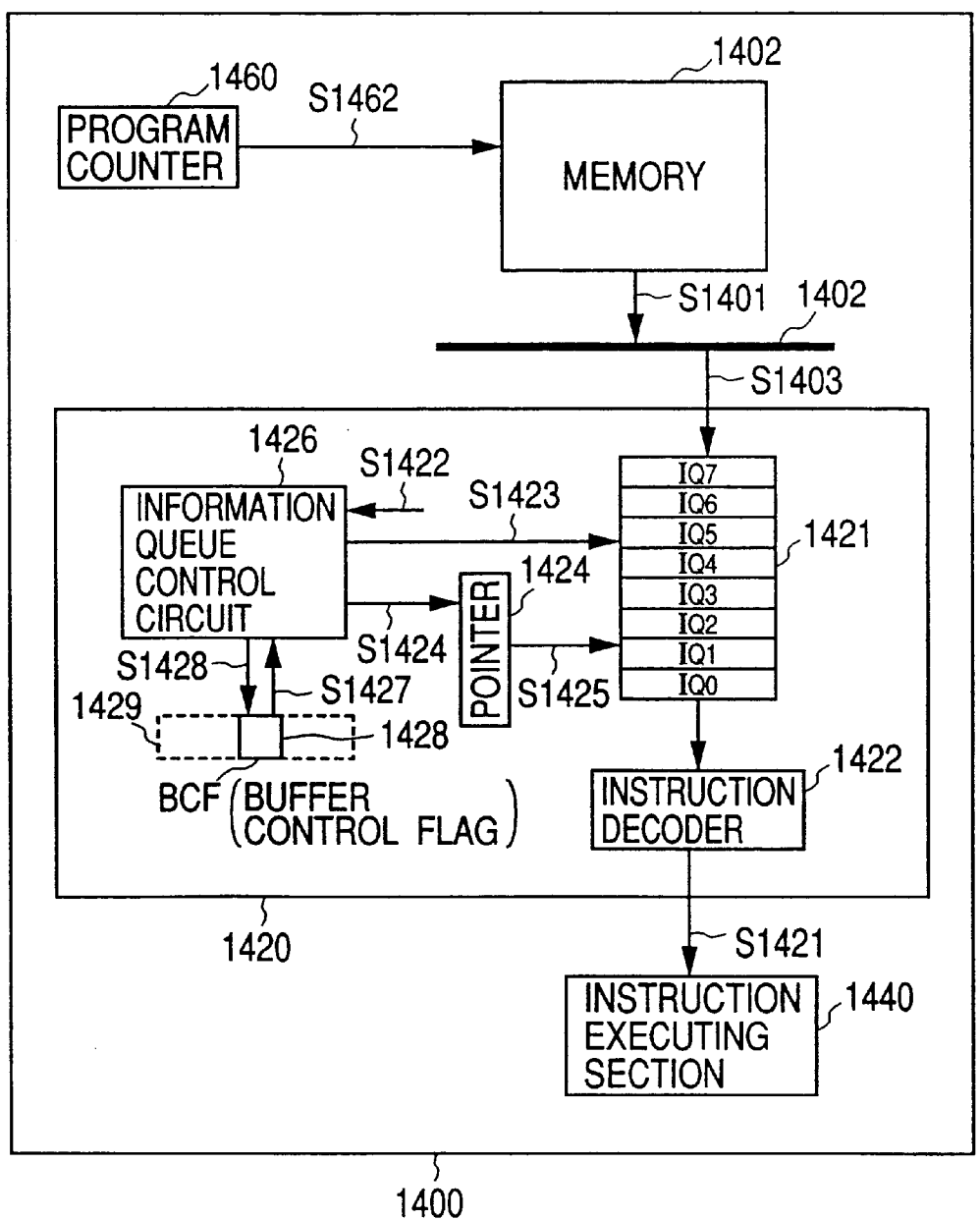
FIG. 11 illustrates the configuration of a data processing apparatus representing a fourth embodiment of the invention (Embodiment 4).
Figure 12:
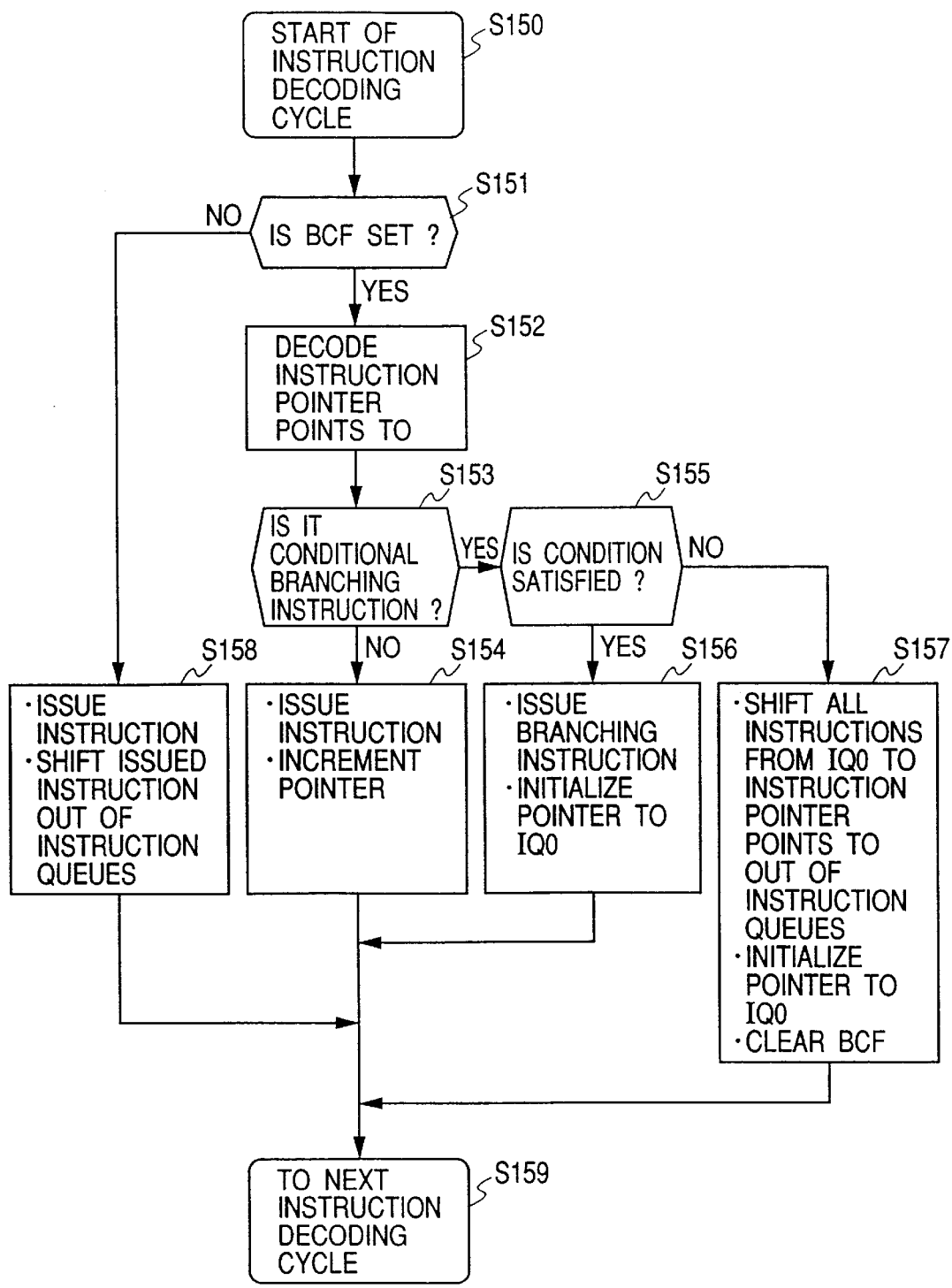
FIG. 12 illustrates control by the data processing apparatus of Embodiment 4.

FIG. 11 illustrates the configuration of a data processing apparatus representing a fourth embodiment of the present invention. A data processing apparatus 1400 consists of a data processing section comprising a control section 1420, a program counter 1460 and the like, and of a memory 1402. The data processing apparatus 1400 may either be formed over a single semiconductor substrate or only the aforementioned data processing section may be formed over a single semiconductor substrate. The control section 1420 consists of an instruction decoder 1422, instruction queues 1421 (TQ0~7), a pointer 1424, an instruction queue control circuit 1426, a control register 1429 and the like.

The memory 1402 is, for example, either a read only memory (ROM) or random access memory (RAM) as a main storage or a cache memory for holding some of the instructions to be stored into the main storage. The ROM may consist of, for instance, either a mask ROM programmed in a semiconductor manufacturing process or an electrically rewritable non-volatile memory such as a flash memory. The RAM may consist of, for instance, a static random access memory (SRAM), a dynamic random access memory (DRAM), or a ferroelectric memory (an electrically rewritable nonvolatile whose write cycle and read cycle are substantially equal).

Incidentally, the output S1462 of the program counter 1460 may be supplied to the memory 1402 via an address bus.

The instruction queues (IQ0~7) function as conventional queues when reiterative instruction reading is not performed.

To describe the operation of the data processing apparatus 1400, the program description used for describing the operation of the data processing apparatus 100 is presented here again.
gr0←m;
set BCF;
LOOP: inst(1);
  inst(2);
  .
  .
  .
  inst(n);
gr0←gr0−1;
if NZ goto LOOP;
The data processing apparatus 1400 is caused to effect control in accordance with the following rules.
(i) The buffer control flag 1428 (BCF) is referred to, and (ii) will be followed if it is set, or (viii) will be followed if it is not set (S151).
(ii) The instruction the pointer 1424 points to is decoded. (iii) will be followed (S152).
(iii) If the decoded instruction is not a conditional branching instruction (if NZ goto LOOP in the above-cited example), (iv) will be followed, or if it is a conditional branching instruction, (v) will be followed (S153).
(iv) An instruction is issued, and the pointer 1424 is incremented (S154). (ix) will be followed.
(v) If the branching condition is satisfied, (vi) will be followed, or if not, (vii) will be followed (S155).
(vi) A branching instruction is issued, and the pointer 1424 is initialized to IQ0 (S156). (ix) will be followed.
(vii) All the instructions from IQ0 to that the pointer 1424 pointed to are shifted out of the instruction queues 1421, the pointer 1424 is initialized, and the buffer control flag 1428 (BCF) is cleared (S157). (ix) will be followed.
(viii) The instruction the pointer 1424 points to is decoded and issued. The issued instruction is shifted out of the instruction queues 1421 (S158). (ix) will be followed.
(ix) A shift to the next decode cycle takes place (S159)

Thus, by this embodiment, without using a repeat instruction, instructions are read out of the instruction queues (IQ0~7) reiteratively when processing a loop. In that while, since the instruction queues (IQ0~7) are filled with instructions, no instruction is read out of the memory 1402, making it possible to save the power consumed in memory accessing.

Further, in this embodiment, unless the buffer control flag 1428 (BCF) is set, the instruction queues (IQ0~7) are used in the conventional way in the processing of any loop. Therefore, in order to forbid the application of the control to read an instruction out of the instruction queues (IQ0~7) reiteratively in executing a certain loop, it is sufficient merely to refrain from inserting an instruction (set BCF) to set the buffer control flag 1428 (BCF) immediately before the execution of the loop (immediately before inst(1)) in the above-cited example).

If the mode of this embodiment is applied to a microprocessor already equipped with instruction queues, there will be no need to add a buffer 105 as in Embodiment 1, resulting in the benefit of enabling the occupied area to be saved.

Embodiment 5

Figure 13:
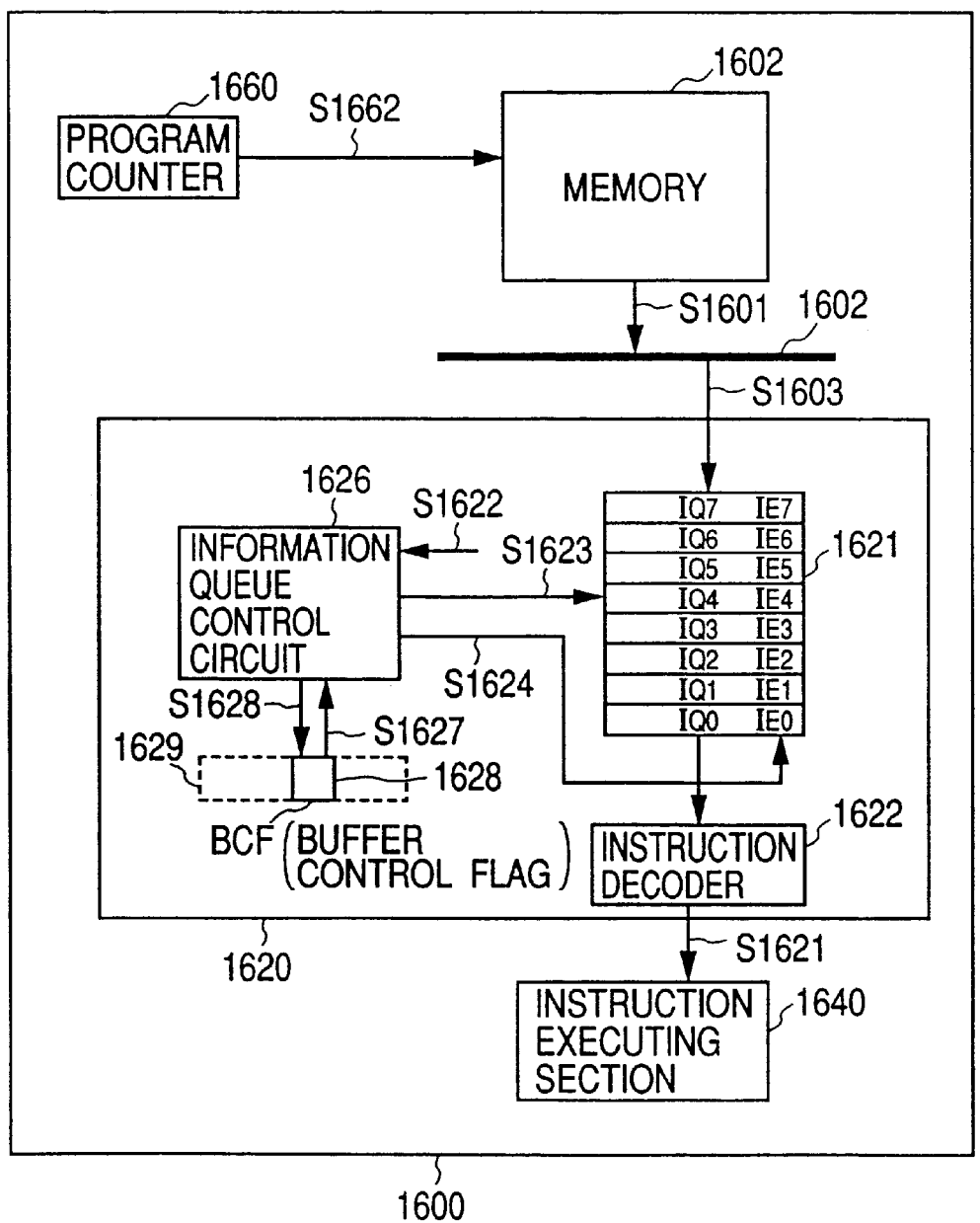
FIG. 13 illustrates the configuration of a data processing apparatus representing a fifth embodiment of the invention (Embodiment 5).
Figure 14:
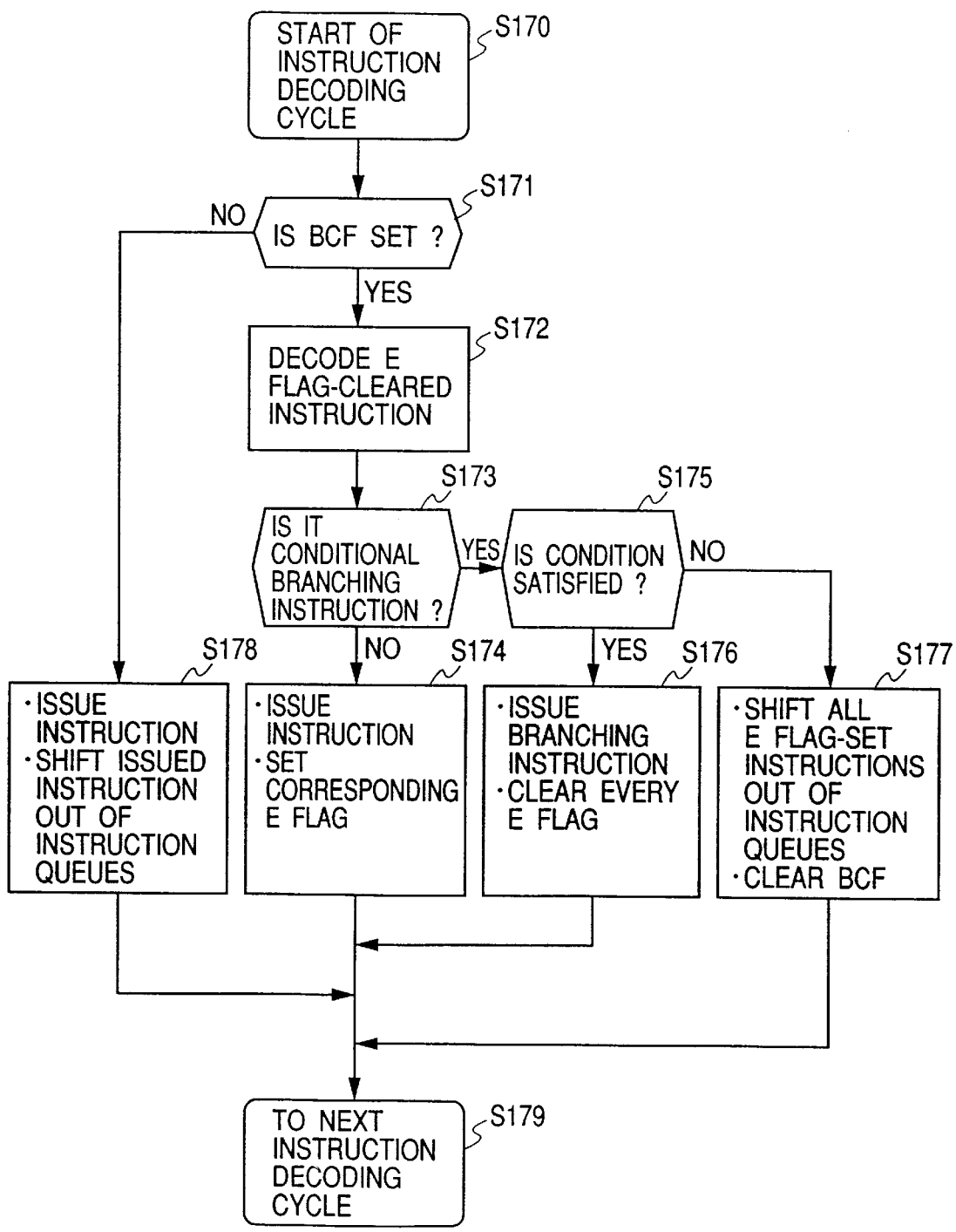
FIG. 14 illustrates control by the data processing apparatus of Embodiment 5.

FIG. 13 illustrates the configuration of a data processing apparatus representing a fifth embodiment of the present invention. A data processing apparatus 1600 consists of a data processing section comprising a control section 1620, an instruction executing section 1640, a program counter 1660 and the like, and of a memory 1602. The data processing apparatus 1600 may either be formed over a single semiconductor substrate or only the aforementioned data processing section may be formed over a single semiconductor substrate. The control section 1620 consists of an instruction decoder 1622, instruction queues 1621 (IQ0~7), an instruction queue control circuit 1626, a control register 1629 and the like.

The memory 1602 is, for example, either a read only memory (ROM) or random access memory (RAM) as a main storage or a cache memory for holding some of the instructions to be stored into the main storage. The ROM may consist of, for instance, either a mask ROM programmed in a semiconductor manufacturing process or an electrically rewritable non-volatile memory such as a flash memory. The RAM may consist of, for instance, a static random access memory (SRAM), a dynamic random access memory (DRAM), or a ferroelectric memory (an electrically rewritable non-volatile whose write cycle and read cycle are substantially equal).

Incidentally, the output S1662 of the program counter 1660 may be supplied to the memory 1602 via an address bus.

The data processing apparatus 1600, like the data processing apparatus 1400, utilizes instruction queues (IQ0~7).

However, it uses execution flags (E0~7) accompanying the instruction queues (IQ0~7) in place of the pointer 1424 in the data processing apparatus 1400.

The data processing apparatus 1600 is caused to effect control in accordance with the following rules.

(i) The buffer control flag 1628 (BCF) is referred to, and (ii) will be followed if it is set, or (viii) will be followed if it is not set (S171).

(ii) An instruction whose execution flag (E flag: E0~7) is cleared is decoded (S172). (iii) will be followed.

(iii) If the decoded instruction is not a conditional branching instruction (if NZ goto LOOP in the above-cited example), (iv) will be followed, or if it is a conditional branching instruction, (v) will be followed (S173).

(iv) An instruction is issued, and the matching execution flag (E0~7) is set (S174). (ix) will be followed.

(v) If the branching condition is satisfied, (vi) will be followed, or if not, (vii) will be followed (S175).

(vi) A branching instruction is issued, and all the execution flags (E0~7) are cleared (S176). (ix) will be followed.

(vii) All the instructions for which execution flags (E0~7) are set are shifted out of the instruction queues (IQ0~7), and the buffer control flag 1628 (BCF) is cleared (S177). (ix) will be followed.

(viii) An instruction is decoded and issued. The issued instruction is shifted out of the instruction queues (IQ0~7) (S178). (ix) will be followed.

(ix) A shift to the next decode cycle takes place (S179).

Thus, by this embodiment, without using a repeat instruction, instructions are read out of the instruction queues (IQ0~7) reiteratively when processing a loop. In that while, since the instruction queues (IQ0~7) are filled with instructions, no instruction is read out of the memory 1602, making it possible to save the power consumed in memory accessing.

Further, in this embodiment, unless the buffer control flag 1628 (BCF) is set, the instruction queues (IQ0~7) are used in the conventional way in the processing of any loop. Therefore, in order to forbid the application of the control to read an instruction out of the instruction queues (IQ0~7) reiteratively in executing a certain loop, it is sufficient merely to refrain from inserting an instruction (set BCF) to set the buffer control flag 1628 (BCF) immediately before the execution of the loop (immediately before inst(1)) in the above-cited example).

If the mode of this embodiment is applied to a microprocessor already equipped with instruction queues, there will be no need to add a buffer 105 as in Embodiment 1, resulting in the benefit of enabling the occupied area to be saved. Moreover, as it is possible with this embodiment, when executing instructions reiteratively using the instruction queues (IQ0~7), it is possible to alter the sequence of instructions in the loop and issue executable instructions before others, there is another benefit that loop processing can be made faster than with Embodiment 4.

The modes of carrying out the present invention can be classified as shown in FIG. 15. The following three alternatives can be cited as means to determine whether or not to use a buffer for reading instructions reiteratively in processing a certain loop.

(1) Introduction of a control flag. For instance, the buffer control flag 124 (BCF) of Embodiment 1.

(2) Loading of the number of loop repetitions into a loop count register. For instance, the loop count register 742 (LC) of Embodiment 2.

(3) Checking the difference between the leading and trailing address register counts in repetition. For instance, the repeat start address register 931 (RS), repeat end address register 932 (RE) and their difference detecting circuit 937 of Embodiment 3.

On the other hand, means to realize a buffer can be broadly classified into the following two.

(i) A buffer is provided separately from instruction queues. For instance, the buffer 104 of Embodiment 1 is an entirely functional block from instruction queues.

(ii) A buffer is realized by diverting instruction queues. For instance, the buffer (IQ0~7) of Embodiment 4 or 5 are also used as instruction queues.

Modes of carrying out the present invention can be realized by combining as desired (1) through (3) and (i) through (ii) (in 3×2=6 sets). Therefore, besides the combinations presented as Embodiments 1, 2, 3, 4 and 5, embodiments combining (2) and (i) or (3) and (ii) above can also be realized.

The invention accomplished by the present inventor has so far been described specifically with reference to embodiments thereof, the invention is not limited to them, but it goes without saying that various modifications are possible without deviating the spirit thereof.

To describe briefly the effects that can be attained by the typical of the aspects of the invention disclosed in this application, the following can be said.

Thus, there can be provided a data processing apparatus provided with a control means to reduce the power required for memory accessing, in spite of the unavailability of a repeat instruction, by reading instructions reiteratively from a small scale buffer in loop processing. Furthermore, there can be provided a data processing apparatus provided with a means to opt to apply, or not to apply, control to read instructions, that have to be executed reiteratively in loop processing, out of a small scale buffer reiteratively.

What is claimed is:

1. A data processing apparatus, comprising:

a first instruction storing means, a second instruction storing means for temporary holding a series of instructions to be executed reiteratively, and a register means, wherein when the content of said register means satisfies a specific condition after execution of a first instruction to alter the content of said register means prior to a series of instructions to be executed reiteratively, said second instruction storing means holds the series of instructions and causes the series of instructions to be outputted reiteratively from the second instruction storing means, and wherein when the content of said register means does not satisfy the specific condition after the execution of the first instruction, the series of instructions are reiteratively read from the first instruction storing means.

2. A data processing apparatus, as stated in claim 1, wherein the final one of said series of instructions to be executed reiteratively is an instruction to cause branching to the first one of the series of instructions to be effected when the specific condition has come to be satisfied.

3. A data processing apparatus, as stated in claim 2, wherein the first instruction to alter the content of said register means is an instruction to designate the logical value of a bit contained in said register means.

4. A data processing apparatus, as stated in claim 2, wherein the first instruction to alter the content of said register means is an instruction to load the number of times the execution of the series of instructions is to be repeated into said register means.

5. A data processing apparatus, as stated in claim 1, wherein said second instruction storing means is an instruction buffer provided independently from instruction queues to store a plurality of instructions to be read out of said first instruction storing means prior to execution.

6. A data processing apparatus, as stated in claim 1, wherein the first instruction to alter the content of said register means is an instruction to load information to specify the position of the leading one and information to specify the position of the trailing one of said series of instructions to be repeated into said register means.

7. A data processing apparatus, as stated in claim 6, wherein that the number of the instructions to be executed reiteratively, obtained from said information to specify the position of the leading instruction and said information to specify the position of the trailing information, is not greater than a specific value, corresponds to said specific condition.

8. A data processing apparatus, as stated in claim 7, wherein said second instruction storing means is instruction queues to store a plurality of instructions to be read out of said first instruction storing means prior to execution.

9. A data processing apparatus, as stated in claim 1, wherein said second instruction storing means has:
   a memory holding circuit whose constituent elements include:
      a first N channel type MOSFET of which the gate terminal is connected to a first node, either one of the source and drain terminals is connected to a second node and the other to a third node;
      a second N channel type MOSFET of which the gate terminal is connected to said first node, either one of the source and drain terminals is connected to a fourth node and the other to a fifth node;
      a third N channel type MOSFET of which the gate terminal is connected to said fifth node, the drain terminal is connected to said third node and the source terminal is connected to a first operating potential point; and
      a fourth N channel type MOSFET of which the gate terminal is connected to said third node, the drain terminal is connected to said fifth node and the source terminal is connected to said first operating potential point.

10. A data processing apparatus, as stated in claim 9, wherein said second instruction storing means further has an amplifying circuit responsive to input signals pairing said second node and said fourth node.

11. A data processing apparatus, as stated in claim 1, wherein the specific condition is satisfied when the number of instructions included in the series of instructions is smaller than the capacity of said second instruction storing means.

12. A data processing apparatus, as stated in claim 1, wherein said first instruction storing means is a cache memory for storing some of the instructions to be stored in a main memory unit.

13. A data processing apparatus, as stated in claim 1, formed over a single semiconductor substrate.

14. A data processing apparatus, as stated in claim 1, wherein said instructions are nonexistent at the time of source program formulation, but are generated upon conversion into object codes by a compiler.

15. A data processing apparatus on a single semiconductor substrate, comprising;
   a program memory;
   instruction queues arranged to hold instructions stored in said program memory;
   a register; and
   an instruction executing section for executing instructions provided from said instruction queues,
   wherein when a first instruction to alter the content of said register sets the content of said register to a first condition, a series of instructions for repeating execution are read out from said program memory and stored in said instruction queues at a first routine, and then the series of instructions are repeatedly provided from said instruction queues at the following routines, and
   wherein when the first instruction to alter the content of said register sets the content of said register to a second condition, instructions are provided from said program memory via said instruction queues as an instruction pre-fetch buffer.

16. A data processing apparatus, as stated in claim 15, wherein said series of instructions are a plurality of instructions, and the final one of said series of instructions is an instruction to cause branching to the first one of said series of instructions when a prescribed condition is satisfied.

17. A data processing apparatus, as stated in claim 15, wherein the first condition is satisfied when the number of instructions included in the series of instructions is smaller than the number of instruction queues.

18. A data processing apparatus, as stated in claim 17, wherein said program memory is a cache memory for storing some of the instructions to be stored in a main memory unit outside the data processing system.

19. A data processing apparatus, as stated in claim 18, wherein the first instruction to alter the content of said register is an instruction to designate the logical value of a bit contained in said register.

20. A data processing apparatus, as stated in claim 18, wherein the first instruction to alter the content of said register is an instruction to load information corresponding to the number of repeats of said instructions to be executed reiteratively into said register.

21. A data processing apparatus, as stated in claim 18, wherein the first instruction to alter the content of said register is an instruction to load information to specify the position of the leading one and information to specify the position of the trailing one of said series of instructions to be repeated into said register.

22. A data processing apparatus, as stated in claim 21, wherein that the difference between said information to specify the position of the leading instruction and said information to specify the position of the trailing information is not greater than a specific value, corresponds to said specific condition.

* * * * *